United States Patent [19]

Tsuda et al.

[11] 3,808,362

[45] Apr. 30, 1974

[54] RECEIVER FOR FACSIMILE SYSTEM

[75] Inventors: Yukifumi Tsuda; Hiroyoshi Tsuchiya; Heijiro Hayami, all of Kawasaki City; Hiroaki Kotera, Osaka, all of Japan

[73] Assignee: Matsushita Electric Industrial Company, Limited, Osaka, Japan

[22] Filed: Dec. 26, 1972

[21] Appl. No.: 318,477

[30] Foreign Application Priority Data

Dec. 24, 1971 Japan .................................. 47-249

[52] U.S. Cl. .......................... 178/7.3 R, 178/DIG. 3

[51] Int. Cl. ............................................... H04n 1/02

[58] Field of Search ... 178/69.5 F, 7.3 R, 5, DIG. 3, 178/7.1

[56] References Cited

UNITED STATES PATENTS

| | | | |
|---|---|---|---|
| 2,909,601 | 10/1959 | Fleckenstein | 178/DIG. 3 |
| 2,978,535 | 4/1961 | Brown | 178/DIG. 3 |
| 3,394,352 | 7/1968 | Wernikoff | 178/DIG. 3 |

*Primary Examiner*—Robert L. Richardson
*Assistant Examiner*—George G. Stellar

[57] ABSTRACT

A receiver for facsimile system, which receives successive binary code signals respectively representing run-lengthes of mark and space signals appearing alternately to each other and a vertical synchronizing pulse signal, which is characterized by a receiver in a facsimile system which receives carrier signal modulated with successive binary code signals respectively representing run-lengthes of mark and space signals appearing alternately to each other and a vertical synchronizing pulse signal, which is characterized by: a demodulator for demodulating the carrier signal so as to produce the successive binary code signals; a code division pulse generator for producing a code division pulse at the end of each of the binary code signals; a reference signal generator for producing a reference pulse signal; a gate pulse generator for producing a gate pulse by using the code division pulse and the reference pulse signal; a decoder for decoding the binary code signals by using the gate pulse.

4 Claims, 64 Drawing Figures

Fig. 3

| n | BINARY CODE |
|---|---|
| 1 | 10 |
| 2 | 11 |
| 3 | 010 |
| 4 | 011 |
| 5 | 00100 |
| 6 | 00101 |
| 7 | 00110 |
| 8 | 00111 |
| 9 | 0001000 |
| 10 | 0001001 |
| ~ | |
| 15 | 0001110 |
| 16 | 0001111 |
| 17 | 000010000 |
| 18 | 000010001 |
| ~ | ~ |
| 31 | 000011110 |
| 32 | 000011111 |
| 33 | 00000100000 |
| 34 | 00000100001 |
| ~ | ~ |
| 63 | 00000111110 |
| 64 | 00000111111 |
| 65 | 0000001000000 |
| 66 | 0000001000001 |
| ~ | ~ |
| 127 | 0000001111110 |
| 128 | 0000001111111 |
| 129 | 000000010000000 |

RECEIVER FOR FACSIMILE SYSTEM

The present invention relates to faximile system and more particularly to an improved faximile system which converts a faximile signal into successive "run-length" binary code signals, transmits the successive run-length binary code signals, and reconverts the run-length binary code signals into the original faximile signal.

A faximile system generally includes a transmitter for converting a photographic image carried on an information medium such as paper into an electric image signal, that is, a faximile signal and for transmitting the faximile signal, and a receiver for receiving the transmitted faximile signal and for reconverting the faximile signal into the original photographic image. Since the faximile signal usually consists of space (white) and mark (black) signals due to the nature of photographic image, it is possible to transmit the faximile signal in the form of successive suitable code signals thereby to narrow the necessary frequency band width of the transmission channel and to save the transmission intervals. Various faximile systems have, therefore, been developed, which transmit the faximile signal in the form of code signals. Since, however, conventional faximile systems of such type necessitates buffer memories of large capacities, those are complicated in construction and much costly.

It is a primary object of the present invention to provide an improved faximile system which is economical.

It is another object of the present invention to provide an improved faximile system including an improved receiver which is capable of correctly decoding transmitted code signals in spite of the fluctuations of the code signals due to the impedance of the transmission line.

These and other objects and the attendant advantages of the invention will become more readily appreciated as the same becomes better understood by reference to the following detailed description when taken in conjunction with the accompanying drawings in which:

FIG. 3 is a table showing a coding system employed for the faximile system of the invention.

Figure 5:
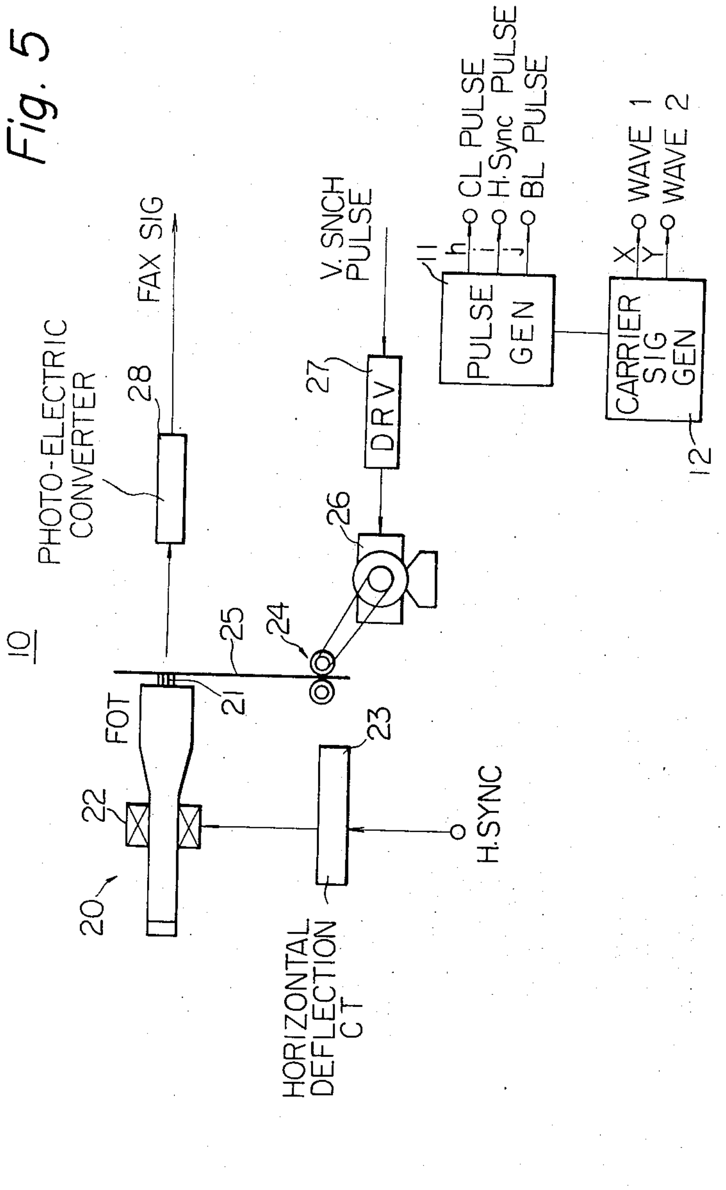
Figure 6A:
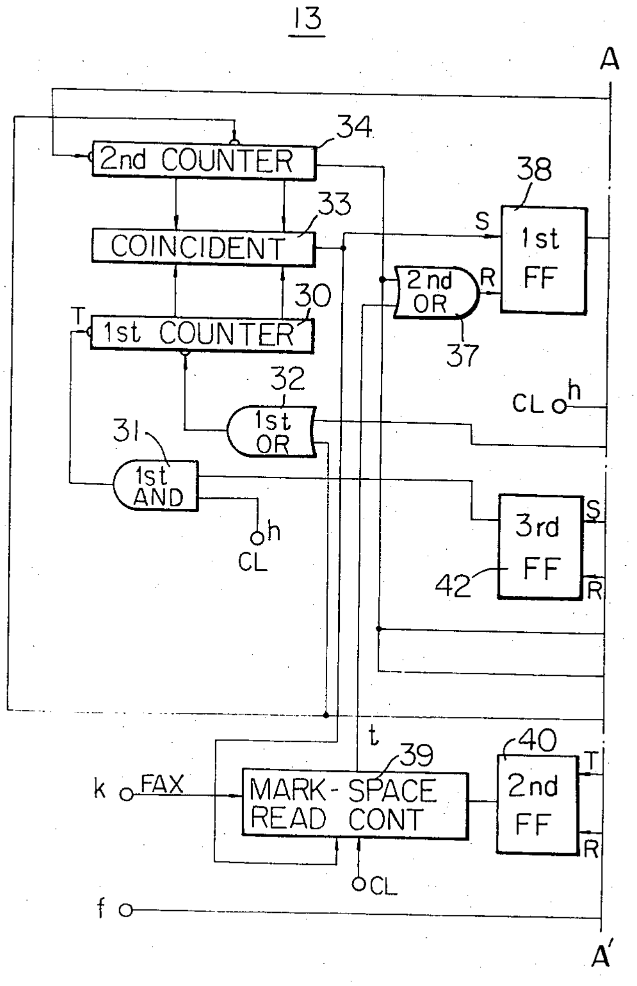

FIGS. 5, 6*a* and 6*b* are block diagrams of a transmitter of a faximile system of the invention.

Figure 6:
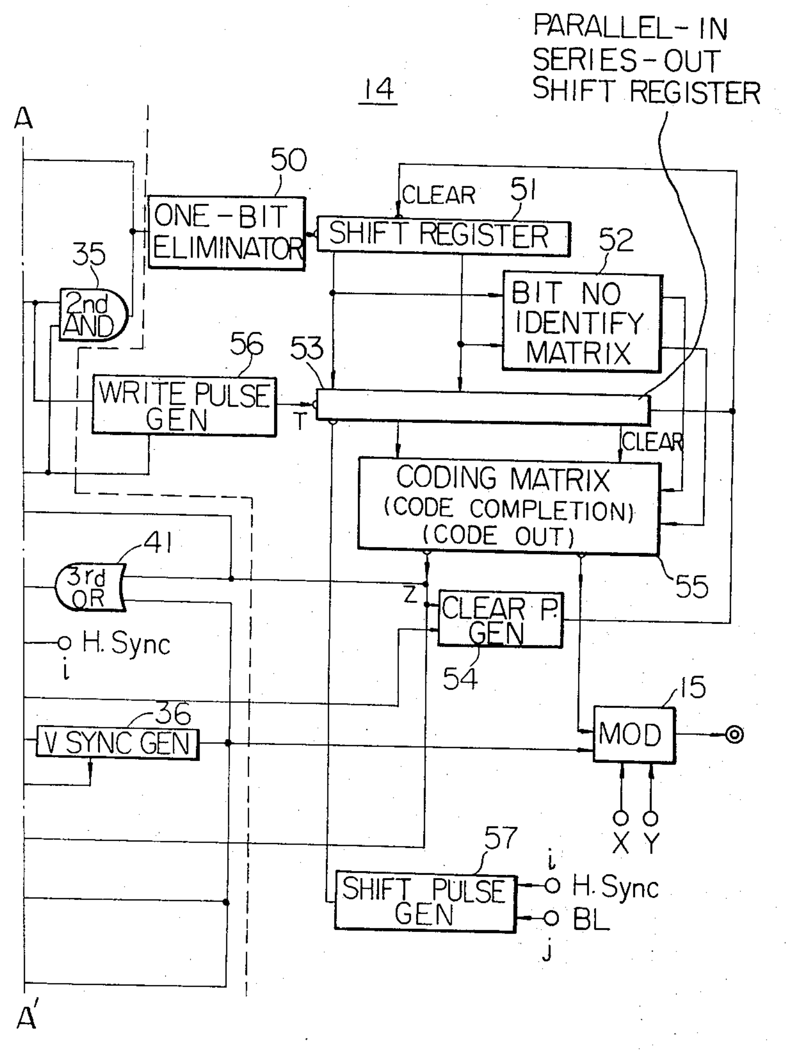
Figures 7A, 7B, 7C, 7D, 7E, 8A, 8B, 8C, 8D:
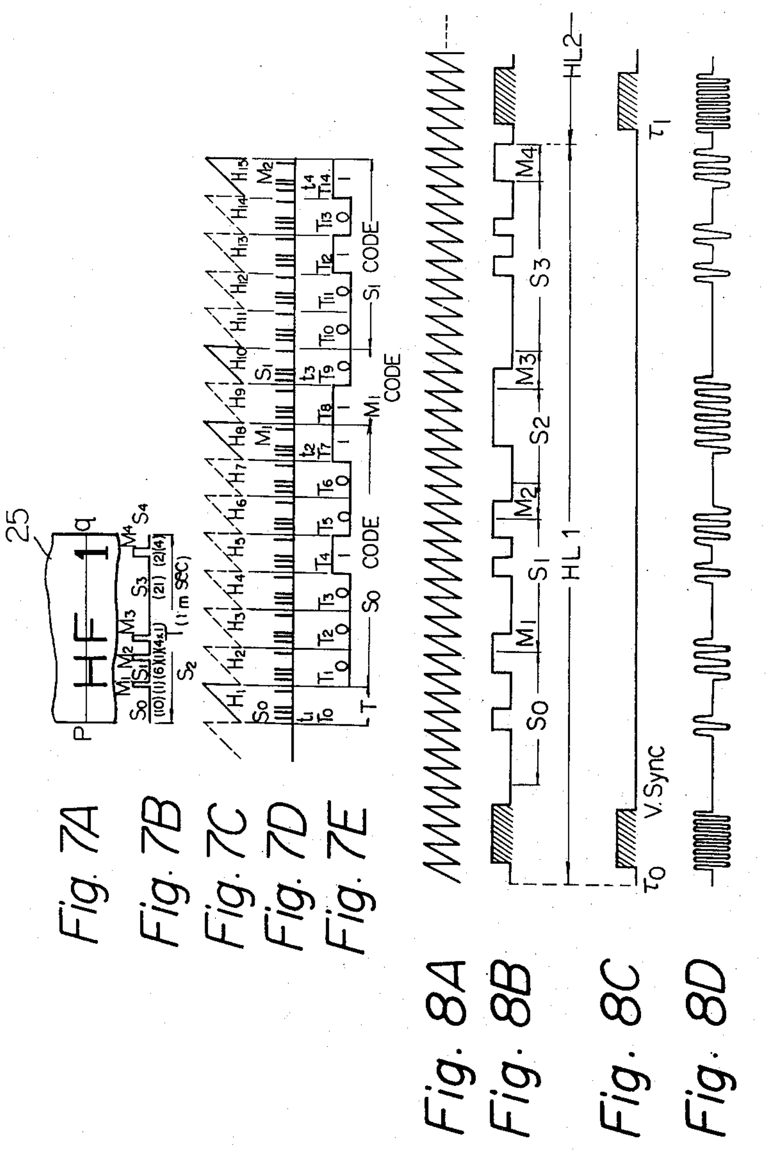

FIG. 7A is a diagram showing an information medium to be processed by the transmitter of FIGS. 5 and 6.

FIG. 7B is a diagram showing a waveform of a faximile signal produced by the photo-electric converter of FIG. 5.

FIGS. 7C, 7D and 7E are diagrams showing waveforms of signals appearing in the transmitter of FIGS. 5 and 6.

FIGS. 8A through 8D are diagrams showing waveforms of signals appearing in the transmitter of FIGS. 5 and 6.

Figures 9A, 9B, 9C, 9D, 9E, 9F, 9G:
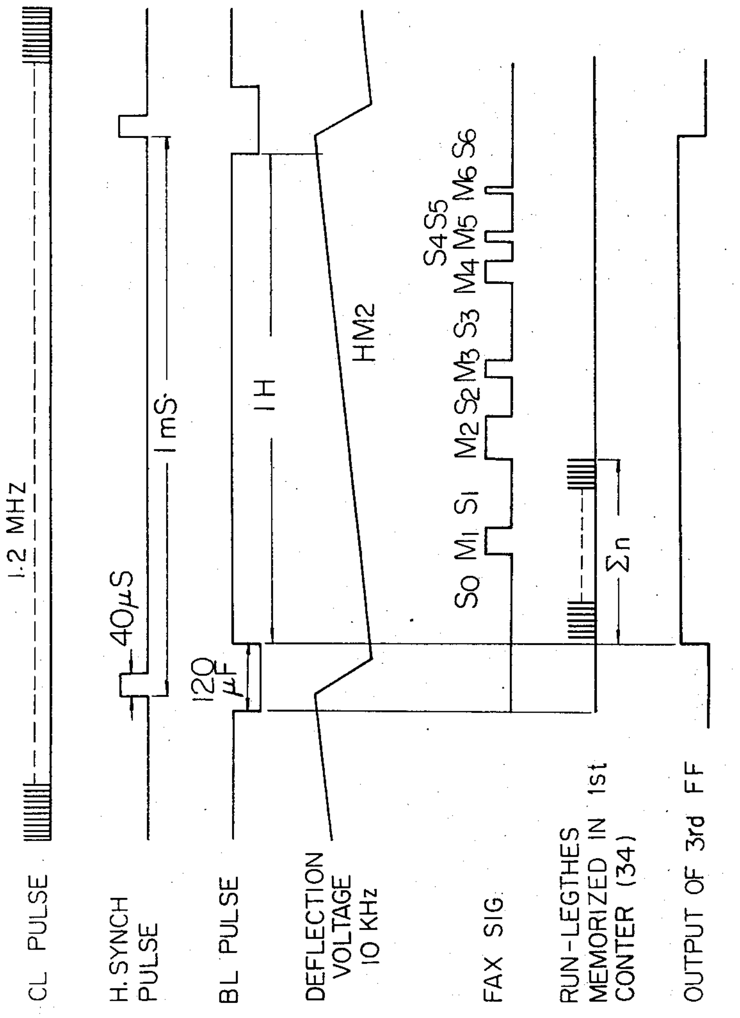
Figures 9H, 9J, 9K, 9L, 9M, 9N, 9P:
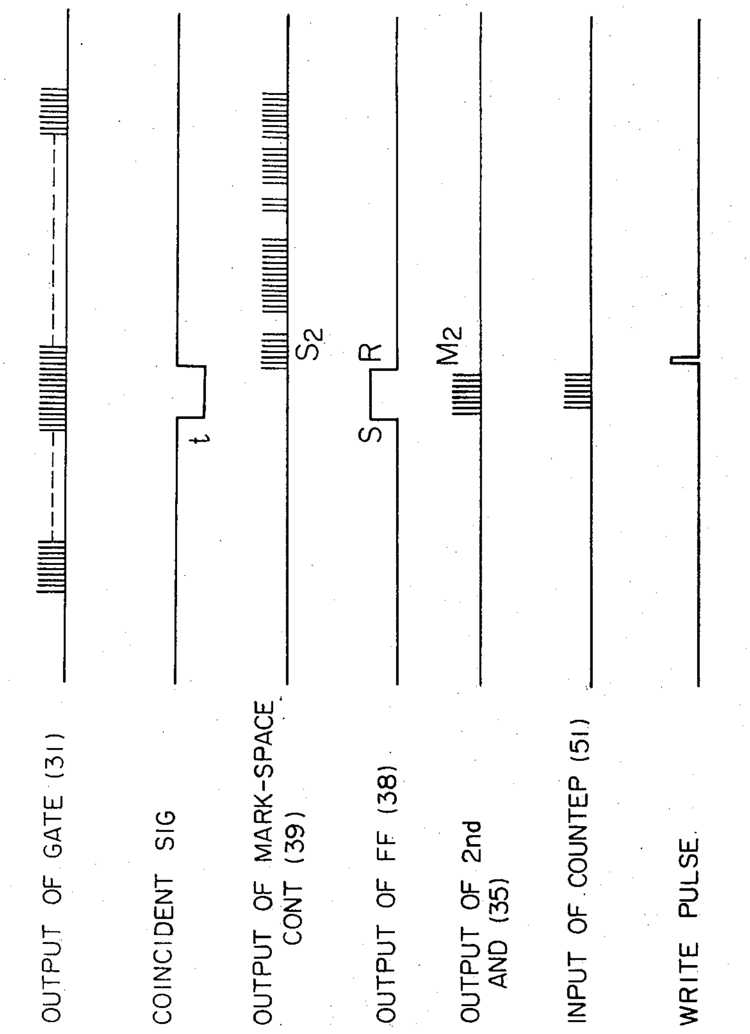

FIGS. 9A through 9P are diagrams showing waveforms of signals appearing in the transmitter of FIGS. 5 and 6.

Figures 10, 11A, 11B, 11C, 11D, 11E:
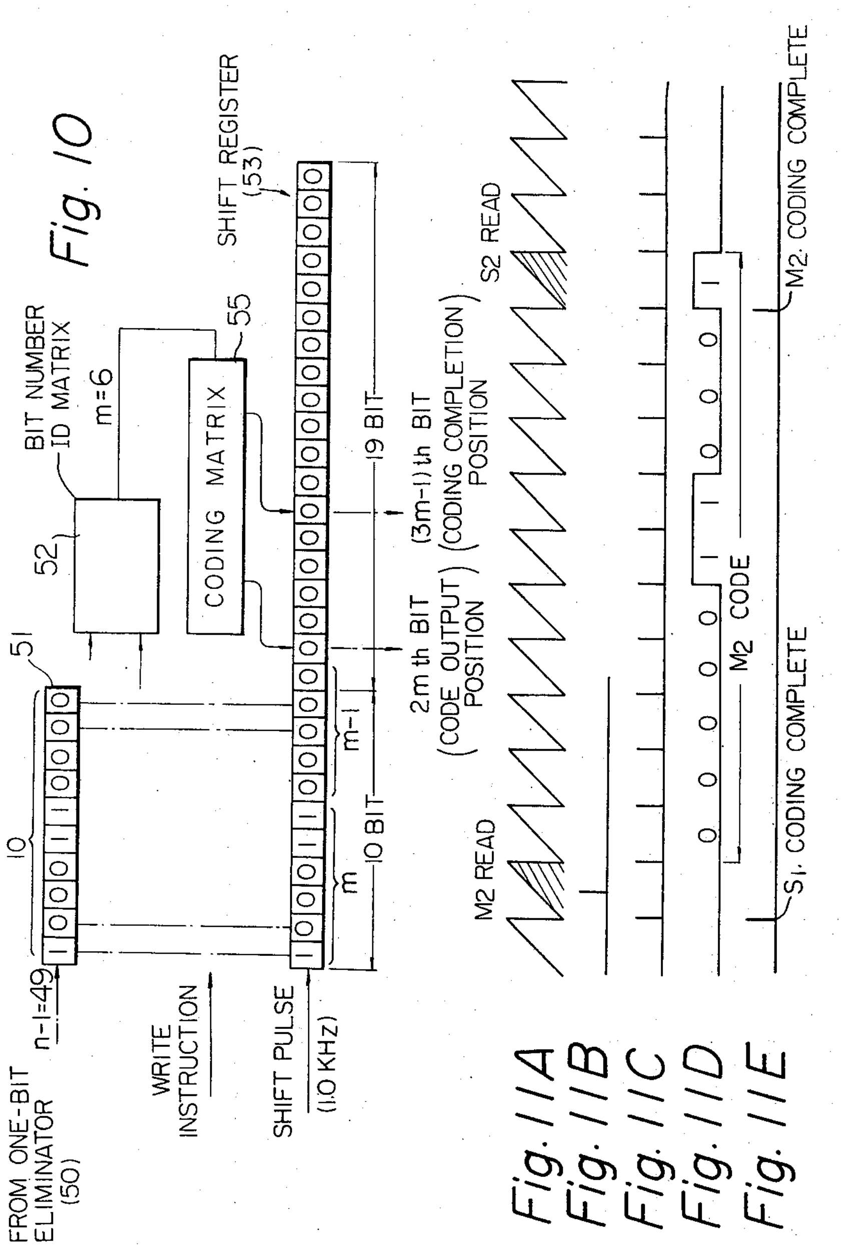

FIG. 10 is a diagram for the explanation of the operation of a coding portion of the transmitter of FIGS. 5 and 6.

FIGS. 11A through 11E are diagrams showing waveforms of signals appearing in the transmitter of FIGS. 5 and 6.

Figure 12A:
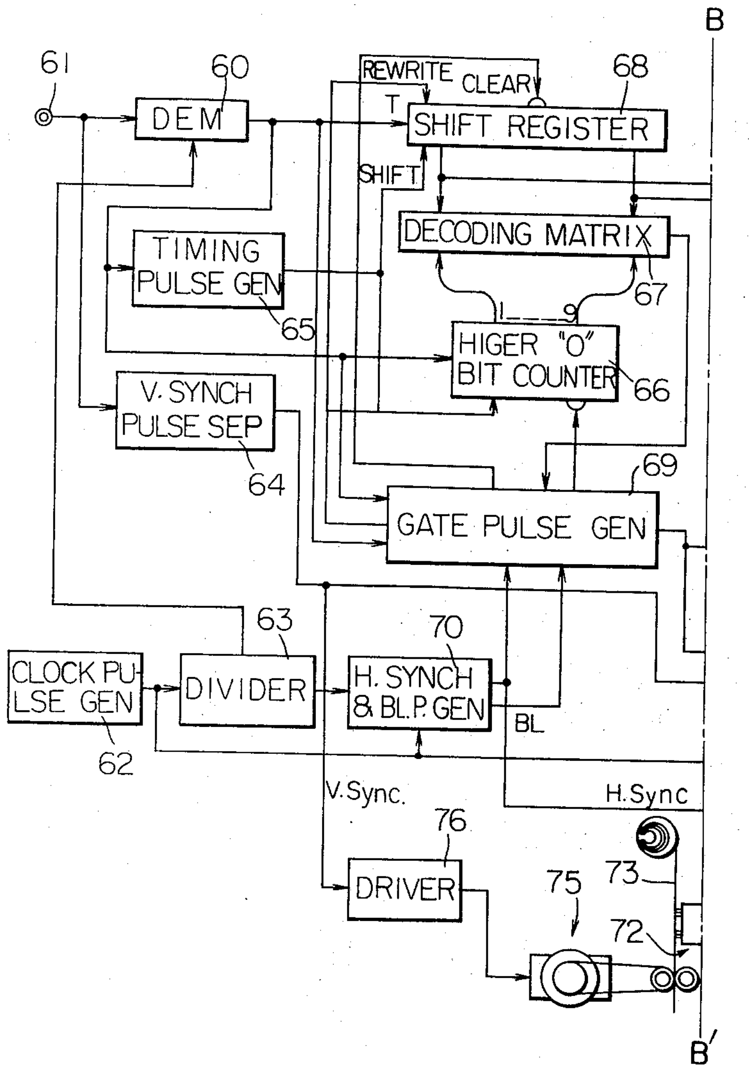

FIGS. 12*a* and 12*b* are schematic block diagrams showing a receiver according to the invention.

Figure 12:
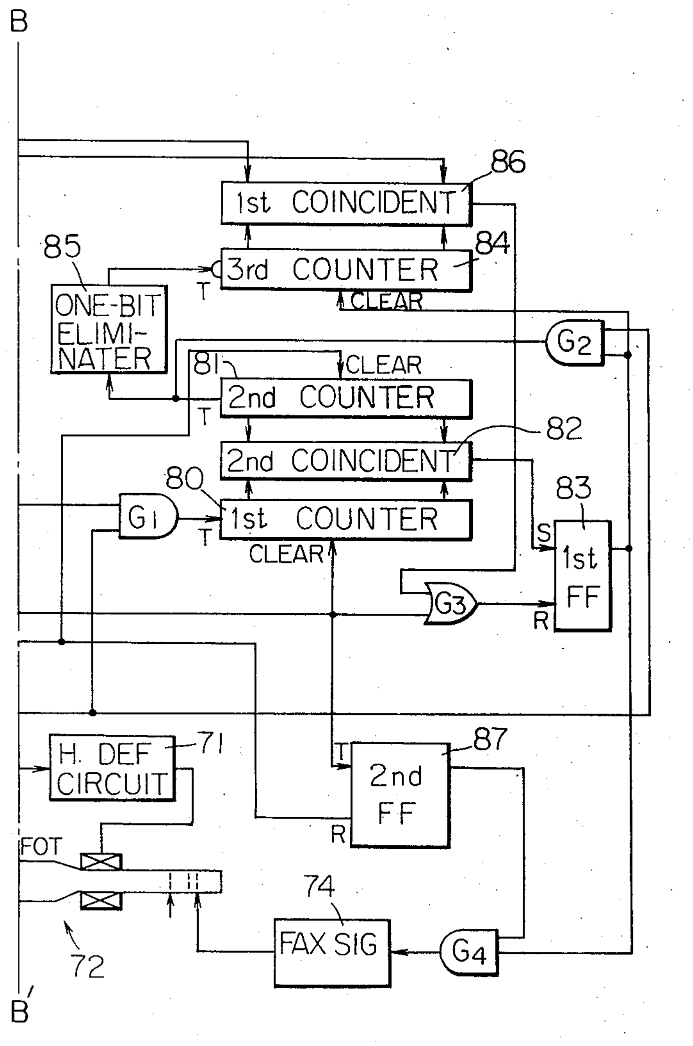

FIGS. 13A through 13M, and 14A through 14D are diagrams showing waveforms of signals appearing in the receiver of FIG. 12.

Figure 15:
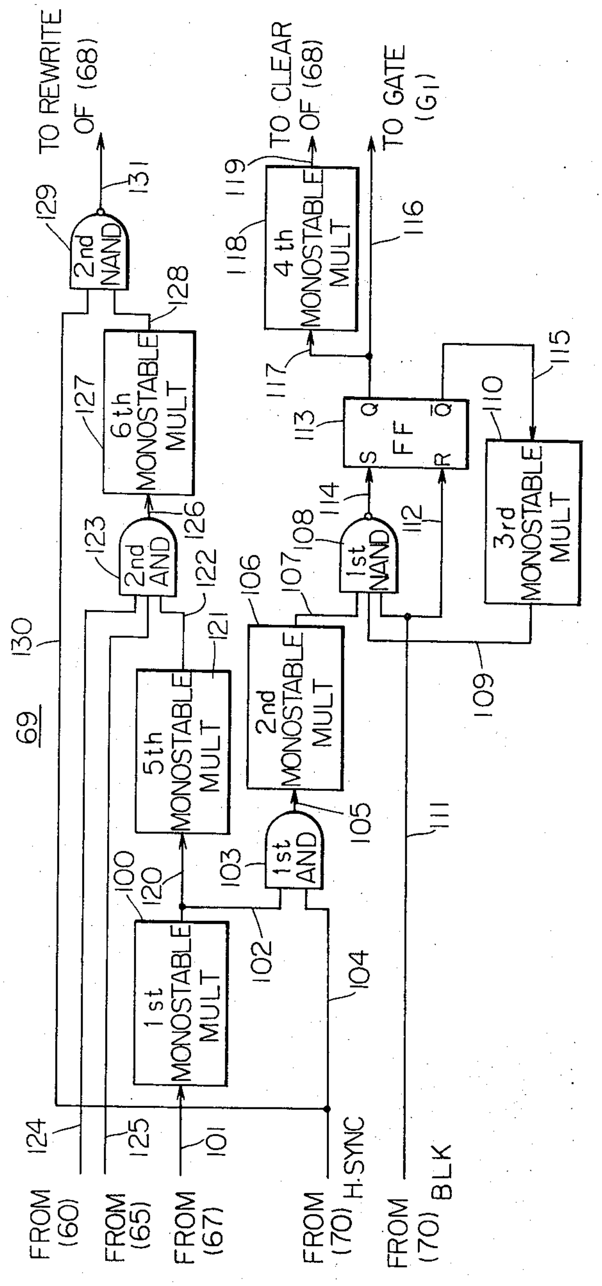

FIG. 15 is a block diagram of a part of the receiver of FIG. 12.

FIGS. 16A through 16L are diagrams showing waveforms of signals appearing in the receiver of FIG. 12.

Figure 1:
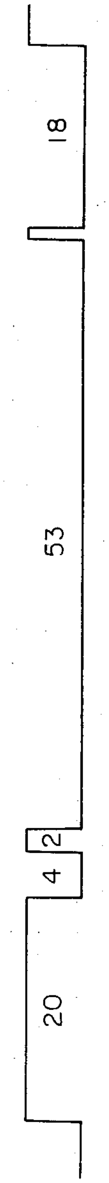
FIG. 1 is a diagram showing a waveform of a faximile signal.

Referring now to the drawings and more specifically to FIG. 1 thereof, there is illustrated a waveform of a faximile signal of 1H which is, namely produced by once horizontally scanning with a light spot an information medium carrying thereon photographic image in the form of letters or figures. It is, in this instance, assumed that the total width of the 1H faximile signal is equal to 98 unit times and mark and space signals of the faximile signal respectively have such widthes as indicated by numerals on the basis of the particular unit time. It is now to be noted that the width of the mark or space signal is usually called run-length.

Figure 2:
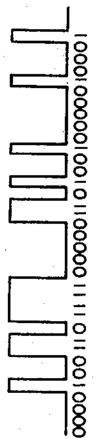
FIG. 2 is a diagram showing successive binary code signals representing the faximile signal of FIG. 1.

In FIG. 2, there is shown successive binary code signals respectively representing the run-length of the mark and space signals in the faximile signal shown in FIG. 1. The binary code signal of FIG. 2 is based on a binary coding system as shown in a table of FIG. 3. As shown in FIG. 2, the total bits of the binary code signals are merely 36 and it is accordingly apparent that the transmission interval can be extremely reduced by transmitting the faximile signal in the form of binary code signals.

The coding system shown in the table of FIG. 3 will be explained hereinbelow.

When a run-length ($n$) of an either mark or space signal is equal to or larger than 3 ($n \geqq 3$), the binary code representing the run-length (n) consists of lower figure binary digits representing $n - 1$ and higher figure digits of one or more 0's the number of which equals to (the number of figure of the binary digits of lower figure − 1). When, for example, n equals to 15 ($n = 15$), the lower figure digits are given by $$n - 1 = 14 \text{ (decimal)} = 1110 \text{ (binary)}.$$

Since the number of figure of the lower digits equals to 4, the higher figure digits are 000. Accordingly, when $n = 15$ the binary code according to the particular system is expressed as 0 0 0 1 1 1 0 (higher) (lower) When $n = 1$ and $n = 2$, the corresponding binary codes are otherwise defined as follows:

$$n = 1 \ldots 10$$

$$n = 2 \ldots 11$$

This coding system is advantageous in that a binary code according to the coding system is shorter in time than that of the corresponding run-length except that $n = 1, 2, 3$, or 5. When, for example $n = 100$, the corresponding binary code is shorter than the run-length by a rate of 13/100 (≈1/7.7). When $n = 500$, the corresponding binary code is shorter than the run-length by a rate of 17/500 (1/29.4).

It is now to be understood that the above-mentioned coding system is effective for reducing the transmission interval for space information between lines, letters or the like.

Figures 4A, 4B, 4C:
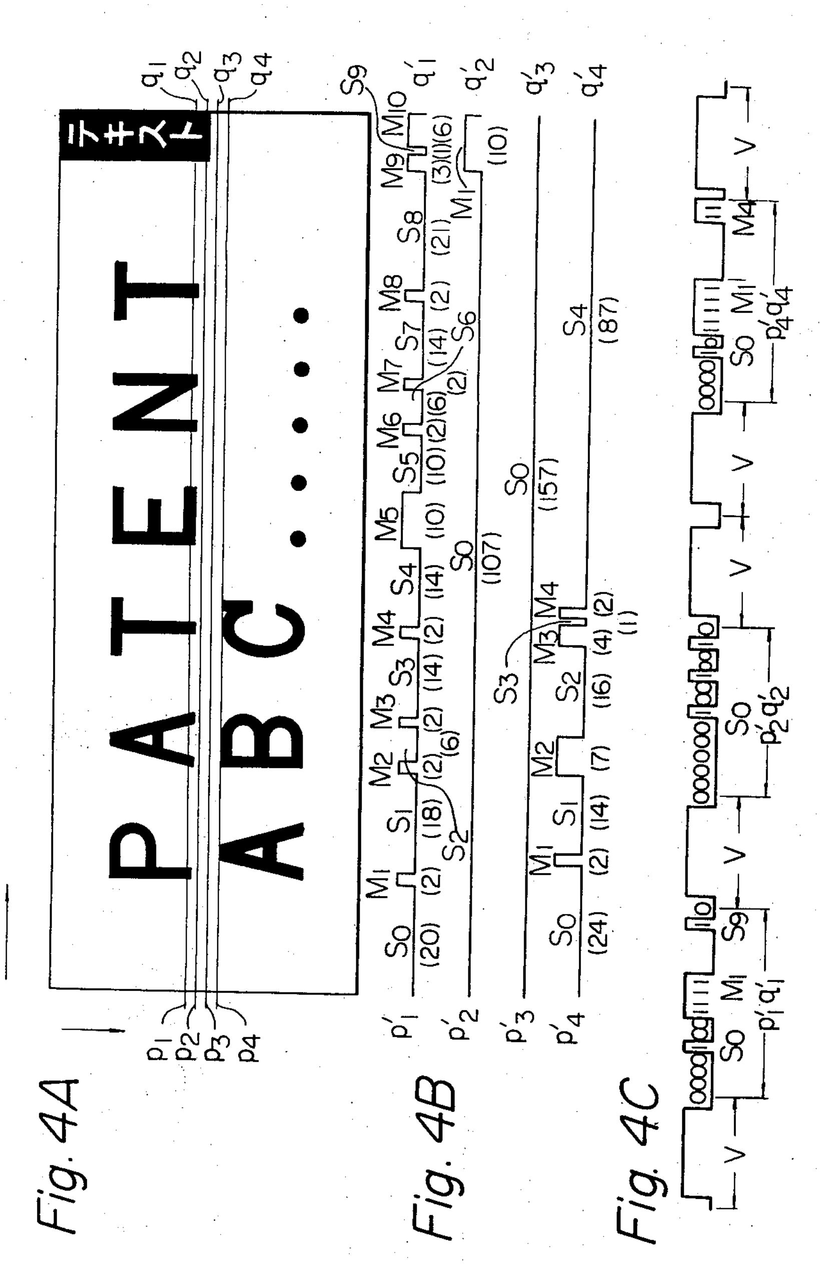
FIG. 4A is a diagram showing an information medium.
FIG. 4B is a diagram showing waveforms produced by scanning with a light-spot the information medium of FIG. 4A.
FIG. 4C is a diagram showing a waveform of a faximile signal transmitted from a transmitter of the faximile system of the invention.

When such photographic image information carried on an information medium as shown in FIG. 4A is scanned along lines $p_1q_1$, $p_2q_2$, $p_3q_3$ and $p_4q_4$, 4, faximile signals $p_1'q_1'$, $p_2'q_2'$, $p_3'q_3'$, and $p_4'q_4'$ are produced in the transmitter, which faximile signals consist of space signals $S_0$, $S_1$, $S_2$, . . . , and mark signals $M_1$, $M_2$, $M_3$, . . . respectively having run-length indicated by parenthesized numerals. The faximile signals are then converted into successive binary code signals are shown in FIG. 4C, wherein pulses V are vertical synchronizing pulses separating the binary code signals each corresponding to a faximile signal of 1-H.

In FIGS. 5 and 6, there is shown a transmitter of a faximile system according to the invention, which generally comprises a faximile signal generator 10 for producing a faximile signal representing photographic image information, a pulse generator 11 for producing a clock pulse signal, a horizontal synchronizing pulse signal and blanking pulse signal, a carrier wave generator 12 for producing carrier waves, a sampler 13 for sampling the faximile signal from the faximile signal generator 10 with the clock pulse signal, a coder 14 for coding the sampled faximile signal into successive binary code signals, and a modulator 15 for modulating a carrier wave with the binary code signals. The faximile signal generator 10 includes a fibre optics cathode-ray tube 20 having a fibre optics faceplate 21 and a horizontal deflection element 22. A horizontal deflection circuit 23 produces a horizontal deflection signal in accordance with a horizontal synchronizing pulse signal from the pulse generator 11. A feed means 24 such as a pair of rollers feeds an information medium 25 carrying thereon image information to be picked up in close proximity to the fibre optics faceplate 21. The feed means 24 is actuated by a prime mover 26 such as an electric pulse motor which is driven by a driver 27 when the driver 27 is energized by a vertical synchronizing pulse signal generated in the sampler 13. A photo-electric converter 28 is positioned in the vicinity of the fibre optics faceplate 21, the converter 28 converts the light-spot modulated by the image information into an electric signal, that is, a faximile signal.

The sampler 13 includes a first binary counter 30 having a trigger input terminal connected to an output of a first AND gate 31 and a clear input terminal connected to an output of a first OR gate 32. Output terminals of the first binary counter 30 are connected to first group input terminals of a coincident circuit 33. The coincident circuit 33 further has second group input terminals connected to output terminals of a second binary counter 34 which has a trigger input terminal connected to an output of a second AND gate 35, and a clear input terminal connected to an output terminal of a vertical synchronizing pulse signal generator 36. The second binary counter 34 has an overflow output terminal through which an overflow signal is produced when the second binary counter 34 overflows. The overflow output terminal is connected to one input of a second OR gate 37 and an input terminal of the vertical synchronizing pulse signal generator 36. The coincident circuit 33 is adapted to produce a coincident signal on an output terminal thereof connected to a set terminal of a first flip-flop circuit 38 and an input terminal of a mark-space signal controller 39. The first flip-flop circuit 38 has a reset terminal connected to an output of the second OR gate 37 and an output terminal connected to one input of the second AND gate 35. The other input of the second AND gate 35 is connected to a clock pulse terminal of the pulse generator 11. The other input of the second OR gate 37 is connected to an output terminal of the mark-space signal controller 39 which has three other input terminals respectively connected to the faximile signal generator, the clock pulse terminal of the pulse generator 11 and an output terminal of a second flip-flop circuit 40. A reset terminal of the second flip-flop circuit 40 is connected to an output terminal of the vertical synchronizing pulse generator 36. The output terminal of the generator 36 is further connected to an input terminal of the driver 27 and to one input of a third OR gate 41 which has an output connected to a set terminal of a third flip-flop circuit 42. A reset terminal of the third flip-flop circuit 42 is connected to a horizontal synchronizing pulse terminal of the pulse generator 11. An output terminal of the flip-flop circuit 42 is connected to one input of the first AND gate 31 the other input of which is connected to the clock pulse terminal of the pulse generator 11. One input of the first OR gate is connected to the output terminal of the vertical synchronizing pulse generator 36.

The coder 14 includes an 1 bit eliminator 50 having an input terminal connected to the output of the second AND gate 35. An output terminal of the 1 bit eliminator 50 is connected to an input terminal of a binary counter 51 having output terminals connected to input terminals of a bit number identify matrix 52 and a parallel in-series out shift register 53. A clear input terminal of the binary counter 51 is connected to an output terminal of a clear pulse generator 54. Output terminals of the bit number identify matrix are connected to input terminals of a coding matrix 55. The parallel in – series out shift register 53 has a trigger input terminal connected to a write pulse generator 56 and a clear input terminal connected to the output terminal of the clear pulse generator 54. The write pulse generator 56 has input terminals respectively connected to the output terminal of the first flip-flop circuit 38 and to the clock pulse terminal of the pulse generator 11. Output terminals of the shift register 53 are connected to input terminals of the coding matrix 55 which has a coding completion signal terminal connected to one input terminal of the clear pulse generator 54 and to input terminals of the first and second OR gates 32 and 41 of the sampler 13. The coding completion signal terminal of the coding matrix is further connected to a trigger terminal of the second flip-flop circuit 40 of the sampler 13. The other input terminal of the clear pulse generator 54 is connected to the overflow terminal of the binary counter 34 of the sampler 13. The shift register 53 has a clear input terminal connected to the output terminal of the clear pulse generator 54 and a shift pulse input terminal connected to an output terminal of a shift pulse generator 57 which has input terminals connected to the horizontal synchronizing pulse terminal and a blanking pulse terminal of the pulse generator 11.

The modulator 15 has an input terminal connected to a code output terminal of the coding matrix 55 and another input terminal connected to the output terminal of the vertical synchronizing pulse generator 36. The modulator further has input terminals connected to output terminals of the carrier pulse signal generator 12. An output terminal of the modulator 15 is to be connected to a suitable transmission channel (not shown).

With reference to FIGS. 7A through 7E, and FIGS. 8A through 8D, the operation of the transmitter of FIGS. 5 and 6 will be explained hereinbelow.

When, for example, the information medium 25 carries thereon such image information as shown in FIG. 7A and the information medium 25 is horizontally scanned along a line *pq*, the faximile signal from the faximile signal generator has such a waveform as shown in FIG. 7B. As shown, the faximile signal consists of space signals $S_0$, $S_1$, $S_2$, $S_3$ and $S_4$, and mark signals $M_1$, $M_2$, $M_3$ and $M_4$. Run-lengthes of the space and mark signals are indicated by parenthesized numerals. It will be also seen that the time period of 1H is assumed to be T. When a horizontal deflection voltage as shown in FIG. 7C is applied to the deflection element 22 of the cathode-ray tube 20 while the information medium 25 is stayed at the same position, the 1H faximile signal of FIG. 7B is repeatedly generated by the photo-electric converter 28 as shown in FIG. 7D. The 1H faximile signal is applied to the sampler 13 which first samples the space signal $S_0$ with the clock pulse signal and applied the sampled space signal to the coder 14. The coder 14 then produces a binary code signal representing the sampled space signal $S_0$ during from a moment $T_1$ to a moment $T_7$. When the coder 14 completes to code the sampled space signal $S_0$, the coder 14 produces a coding completion signal which is applied to the sampler 13. The sampler 13 then samples the mark signal $M_1$ and applies the sampled mark signal $M_1$ to the coder 14 which accordingly converts the sampled mark signal $M_1$ into a binary code signal appearing from $T_8$ to $T_{10}$ as shown in FIG. 7E. The sampler 13 and the coder 14 cooperates as above-mentioned to convert the 1H faximile signal into successive binary code signals.

The successive binary code signals are then applied to the modulator 15 which first mixes the vertical synchronizing pulse signal as shown in FIGS. 8B and 8C and modulate the carrier signal from the carrier signal generator 12 with the code signals and the vertical synchronizing pulse signal as shown in FIG. 8D. It is now to be noted that the transmitter according to the invention does not transmit the last space signal $S_4$ as seen from FIG. 8B.

With reference to FIGS. 9A through 9P, the operation of the sampler 13 will be explained in detail.

FIGS. 9A to 9D respectively show waveforms of the clock pulse signal, horizontal synchronizing pulse signal, blanking pulse signal and horizontal deflection voltage signal. The faximile signal generator produces a 1H faximile signal consisting of mark and space signals as shown in FIG. 9E. The third flip-flop circuit 42 is first set by a vertical synchronizing pulse through the third OR gate 41 from the vertical synchronizing pulse signal generator 36, so that, the third flip-flop circuit 42 produces a logic 1 signal on the output terminal thereof, whereby the first AND gage 31 passes therethrough the clock pulse signal. Since the binary counter 34 is first empty, the coincident circuit 33 immediately produces the coincident signal which is applied to the set terminal of the first flip-flop circuit 38 which then produce a logic 1 signal which permits the second AND gate 35 to pass therethrough the clock pulse signal. When the mark-space read controller 39 detects the leading edge of the mark signal $M_1$ of the faximile signal, the controller 39 produces a stop pulse which is applied through the second OR gate to the reset terminal of the first flip-flop circuit 38. The flip-flop circuit 38 then produces a logic 0 signal which prevents the second AND gate 35 from passing therethrough the clock pulse signal. Thus, clock pulses appearing during the run-length of the space signal $S_0$ are applied to the one-bit eliminator 50 of the coder 14. When the space and mark signals $S_0$, $M_1$ and $S_1$ are sampled by the sampler in such manner as above described, the binary counter 34 memorizes therein the number of clock pulses as shown in FIG. 9F. When the coder 14 completes to code the sampled space signal $S_0$, the coder 14 produces the coding completion signal which is applied through the third OR gate 41 to the third flip-flop circuit 42. The flip-flop circuit 42 then again produces a logic 1 signal on the output terminal thereof as shown in FIG. 9G, whereby the first AND gate 31 passes therethrough clock pulses as shown in FIG. 9H. The counter 30 receives the clock pulses from the first AND gate 31. When the counter 30 receives the same number of clock pulses as that memorized in the counter 34, the coincident circuit 33 produces the coincident pulse signal as shown in FIG. 9J. The coincident pulse signal sets the flip-flop circuit 38 which is, thereafter, reset by the reset signal from the mark-space read controller 39 as shown in FIG. 9K. Accordingly, the flip-flop circuit 38 produces a logic 1 pulse as shown in FIG. 9L. The logic 1 pulse is applied to the second AND gate 35 which then passes therethrough clock pulses as shown in FIG. 9M. The clock pulses from the second AND gate 35 is applied to the one-bit eliminator 50 which then produces a pulse signal as shown in FIG. 9N. The logic 1 pulse is, on the other hand, applied to the write pulse generator 56 which then produces a write pulse as shown in FIG. 9P.

With reference to FIG. 10, the operation of the coder 14 will be explained hereinbelow.

When, for example, *n* number of clock pulses are applied to the one-bit eliminator 50 which then passes therethrough *n*-1 number of clock pulses. The *n*-1 number of clock pulses are then applied to the binary counter 51 which memorize the clock pulses as shown in FIG. 10. The memorized clock pulses constitute the lower bit and are parallel transferred to the parallel-in series-out shift register 53 when the write pulse from the write pulse generator 56 is applied to the shift register 53. The shift register 53 has a capacity of 29 bits when each of the counters 30, 34 and 51 has a capacity of 10 bits. The shift resister 53 add a higher bits of a necessitated number of "0" to the lower bits and delivers through the coding matrix to the modulator 15.

When, for example, the run-length of the mark signal $M_2$ is 50, *n*-1 = 49 (decimal) = 110001 (binary), which binary digits are memorized in the counter 51 as shown in FIG. 10. It is to be noted that the higher bits resides in the righthand portion and the lower bits in the left hand portion in this case. The shift register 53 is triggered by the shift pulse signal from the shift pulse generator 57 whereby the digits in the shift-register 53 shift from the left to the right in this figure. It is assumed that the bit number of the lower digits is $m$, the bit number of the higher digits is ($m$-1, so that the total bit number is 2$m$-1). The coding matrix 55 derives the binary digits from the 2m-th position of the shift-register 53 in accordance with the bit number information from the bit number identify matrix 52. It is now to be noted that the leading digit of the binary code signals according to the coding system of FIG. 3, is always 1. Therefore, the code completion signal is produced in the coding matrix when a logic 1 is shifted to the 3m-th position of the shift register 53.

FIG. 11A shows a waveform of the horizontal deflection voltage. FIG. 11B shows a waveform of a write pulse signal and FIG. 11C shows a waveform of the shift pulse signal. FIG. 11D shows a waveform of the binary code signal representing the mark signal $M_2$ and FIG. 11E shows coding completion pulse signal corresponding to the space signal $S_1$ and the mark signal $M_2$.

Figures 13A, 13B, 13C, 13D, 13E, 13F, 13G, 13H, 14A, 14B, 14C, 14D:
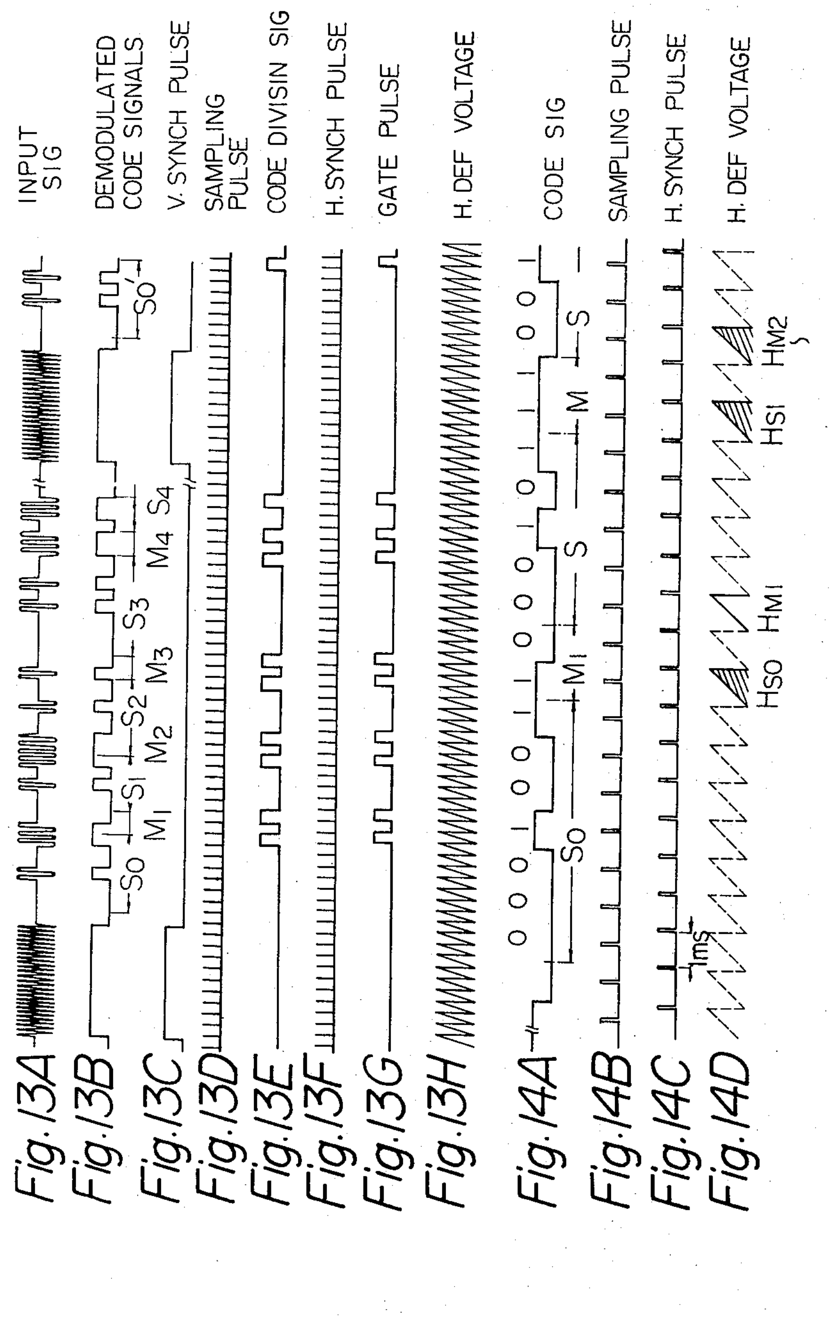

In FIG. 12, there is shown a receiver of a faximile system according to the invention. The receiver comprises a demodulator 60 for demodulating binary code signals transmitted from the transmitter and applied to an input terminal 61. A clock pulse generator 62 produces a clock pulse signal which is applied to a divider 63. The divided pulse signal which has a higher frequency than that of the carrier signal of the transmitted input signal is applied as a sub-carrier signal to the demodulator 60 which then modulates the sub-carrier signal with the input signal and thereafter envelope-detects the modulated sub-carrier signal so as to demodulate the input signal. When the input signal has a waveform as shown in FIG. 13A, the demodulated input code signals have such waveforms as shown in FIG. 13B. A vertical synchronizing pulse separator 64 separates from the demodulated signal a vertical synchronizing pulse signal having such a waveform as shown in FIG. 13C. A timing pulse generator 65 produces a timing pulse signal having such a waveform as shown in FIG. 13D in accordance with the demodulated code signal from the demodulator 60. The vertical synchronizing pulse signal divides the successive binary code signals representing 1-H faximile signals from one another. The demodulated successive binary code signals are applied to a higher 0 bit counter 66 which counts the number of 0 of the higher bit of a binary code signal and produce an indication signal on one of its nine output terminals to inform the number of 0 of the binary code to a decoding matrix 67. A shift register 68, on the other hand, memorize the lower figure digits of the particular binary code signal. When the bit number of the memorized binary code in the shift register 68 coincides with the bit number informed by the 0 bit counter 66, the coding matrix 67 produces a code division pulse which is applied to a gate pulse generator 69. A plurality of code division pulses are successively produced as shown in FIG. 13E. The divided signal from the divider 63 is, on the other hand, applied to a horizontal synchronizing and blanking pulse signal generator 70 which then produces a horizontal synchronizing pulse signal and a blanking pulse signal. The horizontal synchronizing pulse signal is applied to a horizontal deflection circuit 71 which repeatedly energize a deflection element of a fibre optics cathode-ray tube, so that the cathode-ray tube 72 is capable of recording on a recording medium 73 positioned on the faceplate image information when the image information applied to the intensity control element of the tube 72 from a faximile signal amplifier 74. The recording medium 73 is fed by a feeding means such as a pair of rollers which is actuated by a prime mover 75. The prime mover 75 is energized by a driver 76 which is energized with the vertical synchronizing pulse signal from the separator 64. The gate pulse generator 69 repeatedly produces gate pulse on the basis of a horizontal pulse nearest to a code division pulse. The gate pulse train from the gate pulse generator 69 is shown in FIG. 13G. FIG. 13H, on the other hand, shows the horizontal deflection voltage applied to the deflection element of the cathode-ray tube 72.

During the time duration of a gate pulse applied to one input of a first AND gate $G_1$, the AND gate $G_1$ passes therethrough the clock pulse signal which is applied to a trigger terminal of a first binary counter 80. Since a second binary counter 81 is empty, a first coincident circuit 83 immediately produces a coincident signal which is applied to a set terminal of a first flip-flop circuit 83. The flip-flop circuit 83 then produces on its output terminal a logic 1 signal which is applied to one input of a second AND gate $G_2$ and to a clear terminal of a third binary counter 84. The second AND gate $G_2$ then passes therethrough the clock pulse signal which is applied to a trigger terminal of the second binary counter 81 and through an one-bit eliminator 85 to a trigger terminal of the third binary counter 84. A first coincident circuit 86 produces a coincident signal when the code memorized in the shift register 68 coincide with that in the binary counter 84. The coincident signal is delivered to one terminal of a first OR gate $G_3$. The first OR gate $G_3$ passes therethrough the logic 1 signal to a reset terminal of the flip-flop circuit 83 which is then reset thereby to produce a logic "0" signal. It is now apparent that the flip-flop circuit 83 produces a logic 1 signal representing the binary code memorized in the shift register 68. The logic 1 signal from the flip-flop circuit 83 is also applied to one terminal of a third AND gate $G_4$ which applies a logic 1 signal to the faximile signal amplifier 74 when a logic "1" signal is applied to the other terminal thereof from a second flip-flop circuit 87. The flip-flop circuit 87 produces a logic 1 signal only when a mark signal is to be recorded.

In FIG. 14A, the binary code signals are partly shown in an enlarged scale. FIGS. 14B and 14C show in enlarged scale the sampling pulse signal of FIG. 13D and the horizontal synchronizing pulse signal. FIG. 14D shows the horizontal deflection voltage. The mark signals $M_1$ and $M_2$ are recorded on the recording medium during horizontal scanning time intervals $H_{M1}$ and $H_{M2}$ as indicated in the figure.

FIG. 15 illustrates in detail a circuit arrangement of the gate pulse generator 69 according to the invention. The gate pulse generator 69 comprises a monostable multivibrator 100 having an input terminal connected through a line 101 to the output terminal of the decoding matrix 67. An output terminal of the first monostable multivibrator 100 is connected through a line 102 to one input of a first AND gate 103 the other input of which is connected through a line 104 to the horizontal synchronizing pulse and blanking pulse generator 70. An output of the first AND gate 103 is connected through a line 105 to an input terminal of a second monostable multivibrator 106. An output terminal of the second monostable multivibrator 106 is connected through a line 107 to one input of a first NAND gate 108. The first NAND gate 108 has another input connected through a line 109 to an output terminal of a third monostable multivibrator 110 and still another input connected through a line 111 to the blanking pulse terminal of the generator 70 and through a line 112 to a reset terminal of a flip-flop circuit 113. A set terminal of the flip-flop circuit 113 is connected through a line 114 to an output of the first NAND gate 108. An output terminal $\bar{Q}$ of the flip-flop circuit 113 is connected through a line 115 to an input terminal of the third monostable multivibrator 110. Another output terminal $\bar{Q}$ of the flip-flop circuit 113 is connected through a line 116 to an input of the AND gate $G_1$ and further connected through a line 117 to an input terminal of a fourth monostable multivibrator 118 which has an output terminal connected through a line 119 to the clear terminal of the shift register 68.

The output terminal of the first monostable multivibrator 100 is connected through a line 120 to an input terminal of a fifth monostable multivibrator 121 which has an output terminal connected through a line 122 to one input of a second AND gate 123. The second AND gate 123 has other inputs respectively connected through lines 124 and 125 to the output terminals of the demodulator 60 and timing pulse generator 65. An output of the second AND gate 126 is connected to an input terminal of a sixth monostable multivibrator 127. An output terminal of the sixth monostable multivibrator 127 is connected through a line 128 to one input of a second NAND gate 129 the other input of which is connected through a line 130 to the horizontal synchronizing pulse terminal of the generator 70. An output of the second NAND gate 129 is connected through a line 131 to a rewrite terminal of the shift register 68.

Figures 16A, 16B, 16C, 16D, 16E, 16F, 16G, 16H, 16J, 16K, 16L:
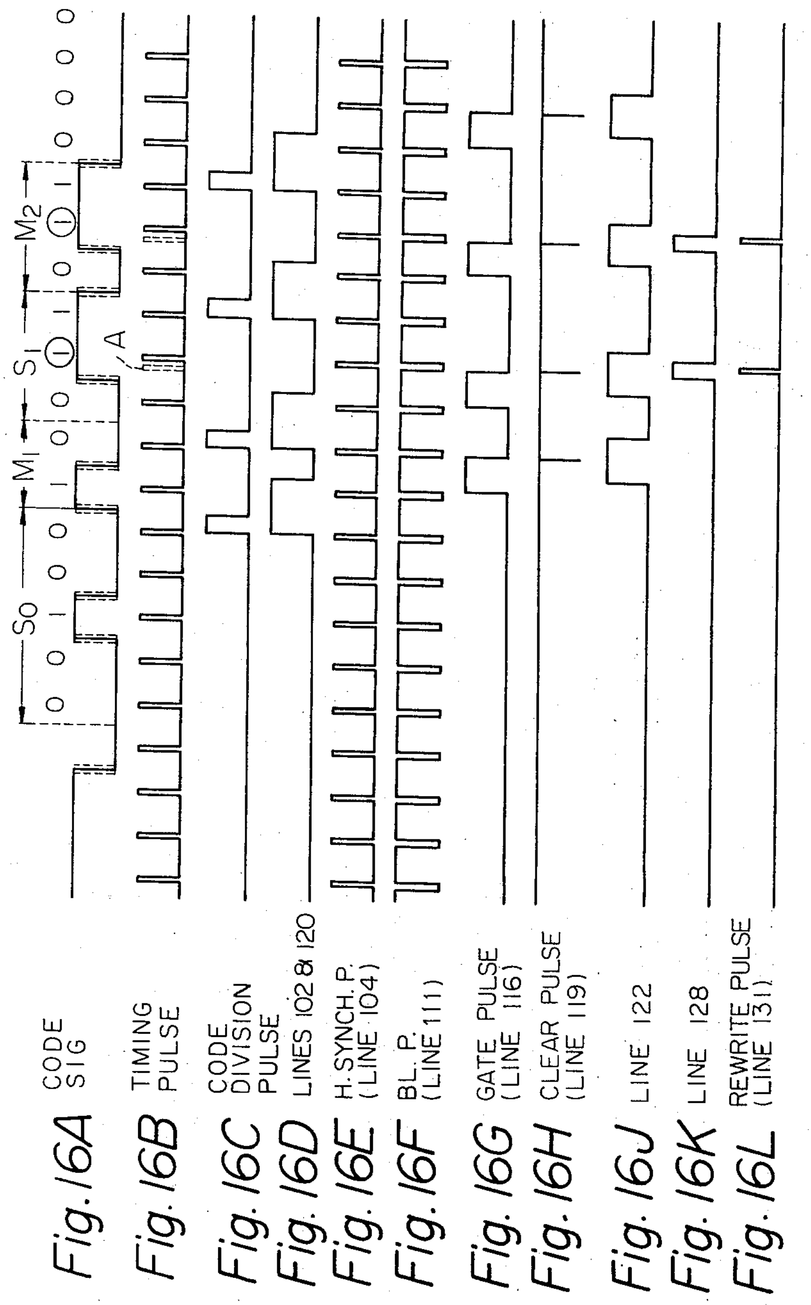

When, in operation, a faximile signal is applied to the demodulator 60, the demodulator 60 produces binary code signals as shown in FIG. 16A. The timing pulse generator 65 receives the binary code signals and produces a timing pulse signal as shown in FIG. 16B. The decoding matrix 67 thus produces code division pulses as shown in FIG. 16C, which code division signal is applied through the line 101 to the first monostable multivibrator 100 which then produces pulses each having a predetermined pulse width as shown in FIG. 16D. The pulses from the first monostable multivibrator 100 is delivered through the line 102 to one input of the first AND gate 103. The horizontal synchronizing pulse signal as shown in FIG. 16E is applied through the line 104 to the other input of the first AND gate 103 which then passes therethrough only one synchronizing pulse appearing nearest to the code division pulse. The second monostable multivibrator 106 is triggered by the horizontal synchronizing pulse passed through the first AND gate 103 so that the second monostable multivibrator 106 produces a pulse which is applied to one input of the first NAND gate 108. The blanking pulse signal from the generator 70 is applied through the line 111 to the other input of the first NAND gate 108 which then passes therethrough the pulse to the set terminal of the flip-flop circuit 113. At this instant, the flip-flop circuit 113 inverts its condition thereby producing a logic 1 signal on the output terminal Q. It the same time, a logic 0 signal is, on the other hand, produced on the terminal $\bar{Q}$, so that the third monostable multivibrator 110 produces a pulse which is applied to the first NAND gate 108. It is to be noted that the pulse from the third monostable multivibrator 110 is effective for preventing an unwanted pulse from the second monostable multivibrator 106 from passing through the first NAND gate 108. The unwanted pulse is produced when, for example, two successive synchronizing pulses are passed through the first AND gate 103 due to the fluctuation of the timing pulses. The flip-flop circuit 113 is reset by one blanking pulse applied through the line 112 to the reset terminal thereof, whereby the flip-flop circuit 113 produces a gate pulse on the line 116 as shown in FIG. 16G. It is now to be understood since the gate pulses produced by the flip-flop circuit 113 are defined by the horizontal synchronizing pulse signal and the blanking puse signal, the gate pulse train has a constant repetition rate and constant pulse widthes thereby causing the receiver to correctly decode the received binary code signals, even if the faximile signal is unwantedly distorted due to the impedance of the transmission line as indicated by broken lines in FIG. 16A. The gate pulse signal is, on the other hand, applied through the line 117 to the fourth monostable multivibrator 118 which then produces on the line 119 a clear pulse signal as shown in FIG. 16H. The clear pulse signal is applied to the clear terminal of the shift register 68.

When, in this instance, one of the timing pulses leads as indicated by a broken line A in FIG. 16B due to the fluctuation of the faximile signal, the clear pulse for clearing the $M_1$ code in the shift register 68 is applied later than the leading timing pulse, so that a leading digit 1 (encircled by a small circle circle as shown in FIG. 16A) is undesiredly cleared or extinguished. In order to solve this problem, the pulse generator 69 further includes the fifth monostable multivibrator 121, second AND gate 123, sixth monostable multivibrator 127 and second NAND gate 129.

When the fifth monostable multivibrator 121 receives from the first monostable multivibrator 100 the pulse signal as shown in FIG. 16D, the fifth monostable multivibrator 121 produces a pulse signal as shown in FIG. 16G. When, therefore, 1 digit pulse and one of the timing pulses are applied through lines 124 and 125 to the inputs of the second AND gate 123, the AND gate 126 produces a pulse which is applied to the sixth monostable multivibrator 127. The monostable multivibrator 127 then produces a pulse signal on the line 128 as shown in FIG. 16K. The NAND gate 129 then passes therethrough one of the synchronizing pulses as shown in FIG. 16L. The synchronizing pulse passed through the second NAND gate 129 is then applied through the line 131 to a rewrite terminal of the shift register 68 when is then forced to memorize a 1 digit. Namely, the erroneously extinguished 1 digit is reproduced.

It should be now appreciated that since the receiver according to the invention for a faximile system produces a gate pulse on the basis of horizontal synchronizing pulse and blanking pulse signals generated in the receiver, the receiver is capable of correctly decoding binary code signals transmitted from the transmitter even if the binary code signals are distorted due to the impedance of the transmission line.

It will be understood that the invention is not to be limited to the exact construction shown and described and that various changes and modifications may be made without departing from the spirit and scope of the invention, as defined in the appended claims.

What is claimed is:

1. A receiver in a faximile system which receives carrier signal modulated with successive binary code signals respectively representing run-lengthes of mark and space signals appearing alternately to each other and a vertical synchronizing pulse signal, which is characterized by:

a demodulator for demodulating said carrier signal so as to produce said successive binary code signals;

a code division pulse generator for producing a code division pulse at the end of each of said binary code signals;

a reference signal generator for producing a horizontal synchronizing pulse and a horizontal blanking pulse signals each having a constant repetition rate;

a gate pulse generator for producing a gate pulse by using said code division pulse and said reference pulse signal; and a decoder for decoding said binary code signals by using said gate pulse.

2. A receiver according to claim 1, in which said gate pulse generator includes a first pulse generator for producing a first pulse having a pulse width smaller than the repetition rate of said horizontal synchronizing pulse signal, a first gate for passing therethrough one pulse of said horizontal synchronizing pulse signal when triggered by said first pulse, and means for producing said gate pulse in response to said one pulse passed through said first gate.

3. A receiver according to claim 2, in which said means includes a second pulse generator for producing a second pulse in response to said one pulse passed through said first gate, a second gate for passing therethrough said second pulse when triggered by an inverted pulse of said blanking pulse signal, and a flip-flop circuit being set by said second pulse passed through said second gate and being reset by said blanking pulse signal.

4. A receiver according to claim 2, in which said means includes a second pulse generator for producing a second pulse in response to said one pulse passed through said first gate, a second gate for passing therethrough said second pulse when triggered by an inverted pulse of said blanking pulse signal, a flip-flop circuit being set by said second pulse passed through said second gate and being reset by said blanking pulse signal, and means for forbidding said second pulse to pass therethrough two successive horizontal synchronizing pulses.

* * * * *